US009417704B1

(12) United States Patent
Smus et al.

(10) Patent No.: US 9,417,704 B1
(45) Date of Patent: Aug. 16, 2016

(54) GESTURE ONSET DETECTION ON MULTIPLE DEVICES

(71) Applicant: Google Inc., Mountain View, CA (US)

(72) Inventors: Boris Smus, San Francisco, CA (US); Christian Plagemann, Palo Alto, CA (US); Ankit Mohan, San Mateo, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/218,168

(22) Filed: Mar. 18, 2014

(51) Int. Cl.
*G06F 3/01* (2006.01)
(52) U.S. Cl.
CPC ...................................... *G06F 3/017* (2013.01)
(58) Field of Classification Search
None
See application file for complete search history.

(56) References Cited

U.S. PATENT DOCUMENTS

| 8,421,752 | B2 | 4/2013 | DeLuca |
| 2010/0271302 | A1 | 10/2010 | Pering et al. |
| 2012/0016641 | A1* | 1/2012 | Raffa et al. ........................ 703/2 |
| 2013/0009875 | A1 | 1/2013 | Fry et al. |
| 2013/0085705 | A1* | 4/2013 | Jano .................... H04M 1/0208 702/127 |
| 2013/0147770 | A1 | 6/2013 | Dahl et al. |
| 2013/0154919 | A1 | 6/2013 | Tan et al. |
| 2013/0222295 | A1 | 8/2013 | Lim et al. |
| 2013/0229508 | A1 | 9/2013 | Li et al. |
| 2014/0188989 | A1* | 7/2014 | Stekkelpak et al. .......... 709/204 |
| 2014/0282068 | A1* | 9/2014 | Levkovitz ............ G06Q 20/223 715/748 |

FOREIGN PATENT DOCUMENTS

| EP | 2575332 | | 4/2013 |
| JP | 2011135551 | A | 7/2011 |
| WO | 2012/153227 | | 11/2012 |

OTHER PUBLICATIONS

Aumi, "Doplink: using the doppler effect for multi-device interaction", UbiComp'13, Sep. 8-12, 2013, Zurich, Switzerland, Sep. 12, 2013.
Sun, et al., "Spartacus: spatially-aware interaction for mobile devices through energy-efficient audio sensing", MobiSys'13, Jun. 25-28, 2013, Taipei, Taiwan, Jun. 28, 2013.

* cited by examiner

*Primary Examiner* — Kenneth B Lee, Jr.
(74) *Attorney, Agent, or Firm* — Fish & Richardson P.C.

(57) ABSTRACT

Implementations of the disclosed subject matter provide techniques for improved identification of a gesture based on data obtained from multiple devices. A method may include receiving an indication of an onset of a gesture, from a first device, at a gesture coordinating device. Next, first subsequent data describing the gesture may be received from a second device, at the gesture coordinating device. Based on the indication and the first subsequent data, the gesture may be identified. In response to identification of the gesture, an action may be performed based on the gesture identified. In some cases, the gesture coordinating device may be a cloud-based device.

20 Claims, 4 Drawing Sheets

GESTURE ONSET DETECTION ON MULTIPLE DEVICES

BACKGROUND

Accurate detection of a gesture based on the motion of a device (e.g., handheld or wearable) can be difficult to implement. Typically, unreliable sensors such as accelerometers and gyroscopes may be used. However, only a limited amount of information describing a gesture can be discerned on a single device using these unreliable sensors. In some cases, a particular gesture may require some means of verifying the direction of a gesturing device relative to another device (e.g., another device to which the user wishes to transfer content) and to identify the other device toward which a gesture is being aimed. This type of gesture can be difficult to detect using only one on-device sensor. For example, it's impossible to know which direction a device is pointing using unreliable sensors such as accelerometers and gyroscopes.

BRIEF SUMMARY

According to an embodiment of the disclosed subject matter a method may include receiving an indication of an onset of a gesture, from a first device, at a gesture coordinating device. Next, first subsequent data describing the gesture may be received from a second device, at the gesture coordinating device. Based on the indication and the first subsequent data, the gesture may be identified.

An implementation of the disclosed subject matter provides a system including a processor configured to receive an indication of an onset of a gesture, from a first device, at a gesture coordinating device. As a result, first subsequent data describing the gesture may be received from a second device, at the gesture coordinating device. Based on the indication and the subsequent data, the gesture may be identified.

In an implementation, a system according to the disclosed subject matter includes means for receiving an indication of an onset of a gesture, from a first device, at a gesture coordinating device. The system further includes means for receiving first subsequent data describing the gesture, from a second device, at the gesture coordinating device and identifying the gesture based on the indication and the first subsequent data.

Implementations of the disclosed subject matter provide techniques for improved identification of a gesture based on data obtained from multiple devices. By combining data obtained from a first device and one or more other devices, identification of a gesture may be more accurate and the direction of a gesture may be verified. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Detection of a gesture based on the motion of a device (e.g., handheld or wearable) can be difficult to implement, inaccurate, and falsely triggered. Typically, unreliable sensors such as accelerometers and gyroscopes may be used to detect the occurrence of a gesture on a device. However, a limited amount of information may be discerned on a single device using these unreliable sensors. For example, it's impossible to know which direction a device is pointing using unreliable sensors such as accelerometers and gyroscopes.

Increasingly there are other sensors in the environment, such as cameras and microphones. These can be found on traditional devices like TVs, but also on smart devices/appliances. These sensors can be used to increase the accuracy of detecting a gesture, and also facilitate directionality relative to other devices and/or landmarks in a room. However, using all of the sensors in the environment may require cameras that are permanently recording and microphones that are permanently receiving audio signals. Requiring sensors to constantly remain on to continuously receive gesture data can have privacy and power consumption implications.

The present disclosure provides a multi-step gesture detection technique that includes increasingly sophisticated gesture detection using multiple sensors on multiple devices. As an example, a gesture onset detector (D1) may rely on one or more sensors (S1) that may continuously run on a first device. D1 may be a power-efficient gesture onset detector and may run continuously without significant effect on the device. As a user of the first device begins to perform a gesture on the first device, the gesture onset detector (D1) may be triggered. As a result, the onset of the gesture may be detected by the gesture onset detector (D1). The first device may provide, to a gesture coordinating device, an indication of the onset of the gesture. To verify the user's intent and the occurrence of the gesture, another gesture detector (D2), on a second device, may be triggered by an instruction received from the third coordinating device or the first device. Gesture detector (D2) may be turned on and may rely on one or more sensors (S2), and in some cases, the one or more sensors (S2) may be of a different type of sensor than the one or more sensors (S1). For example, S1 may be an inertial measurement unit (IMU) and S2 may be a camera. If the gesture detector D2 receives data from the one or more sensors S2 indicating the occurrence of the gesture, there may be an increased likelihood of the user's intent and the gesture may be identified. Additional gesture detectors using one or more other sensors (e.g., D3 and sensor S3, D4 and sensor S4 . . . $D_n$ and $S_n$), on any combination of the first device, the second device, and/or one or more other devices, may also be used to identify the gesture. In general, gesture detectors can span multiple devices and a set of sensors can span multiple devices as well. Additionally, an arbitrary number of devices may be used to identify a gesture. Once a gesture has been identified based on a predefined number of gesture detectors and associated sensors, the gesture detectors (D2, D3, etc.) may be turned off and their respective sensors (S2, S3, etc.) may be disabled. In some cases, the gesture onset detector D1 and the one or more sensors S1 associated with D1 may continuously run on the first device.

A feature of the presently disclosure subject matter is that rather than continuously running costly sophisticated sensors such as cameras and microphones on one or more devices, economical simple sensors to detect the onset of a gesture that is likely to be occurring, and then subsequently instructing the costly sophisticated sensors to turn on, on one or more other devices, temporarily in order to improve quality of gesture identification. An advantage of the techniques disclosed herein is that costly sophisticated sensors such as cameras and microphones may be turned on less often, thereby reducing the likelihood that potential attackers may access fragmentary streams of information from these sensors. In addition, since costly sophisticated sensors may only be activated as needed, rather than remaining turned on all the time, power may be saved across one or more various devices.

Various implementations of the disclosed subject matter are provided. One option may be to use a gesture onset detector on a device to trigger additional functionality on the device itself. For example, an accelerometer and/or gyroscope may obtain motion data on the device such as a smartphone, which may trigger the camera on the smartphone to take a photo in order to verify the direction the phone is aiming. In this case, the motion data and the direction of the phone may be used to identify a gesture. Another option may be to use a gesture onset detector on a first device to trigger additional functionality on a second device. For example, an accelerometer and/or gyroscope may obtain motion data on the first device, which may trigger the camera on a second device to take a photo in order to verify the direction the first device is aiming. In this case, the motion data from the first device and the direction of the first device obtained by the second device may be used to identify a gesture. Yet another option may be to use the gesture onset detector on a first device to trigger additional functionality on both the first device and a second device. For example, an accelerometer and/or gyroscope may obtain motion data on the first device, which may trigger the microphone on the first device to turn on and emit an audio signal. At the same time, the speaker on the second device may be triggered to turn on in order to verify that first device moved toward the second device based on Doppler shift. In this case, the motion data from the first device and the direction of the first device obtained by the Doppler shift data between the first and second devices may be used to identify a gesture. Alternatively, or in addition, audio-based features other than Doppler shift may be used. For example, relative amplitude may be used in cases in which there are multiple emitting speakers, and time-of-flight audio techniques may be implemented.

In an implementation in which data obtained from a gesture onset detector on a first device is combined with additional data obtained from one or more sensors on one or more other devices, a gesture coordinating device may be used. A gesture coordinating device may facilitate communication between a first device and one or more other devices across one or more bridges between the interfaces. Specifically, the gesture coordinating device may receive an indication of the onset of a gesture from a first device and subsequent data describing the gesture from one or more other devices. As a result, the gesture coordinating device may identify the gesture based on the indication received from the first device and the subsequent data received from the one or more other devices. According to an implementation, a gesture coordinating device may be a cloud-based device.

Figure 1:
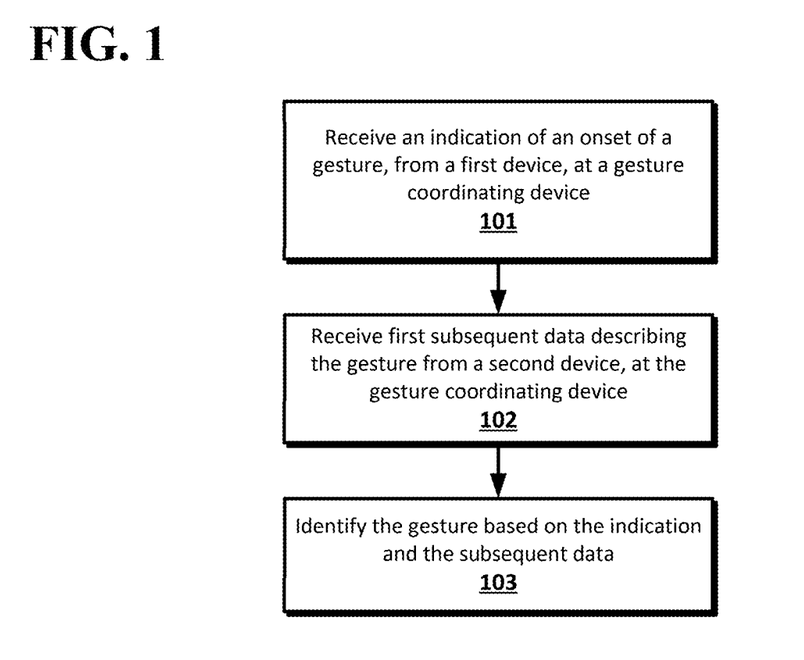
FIG. 1 shows an example process according to an implementation of the disclosed subject matter.

In general, implementations of the disclosed subject matter provide a system that includes a gesture onset detector on a device that may trigger a cascade of more precise detectors on one or more other devices. The present disclosure provides techniques for improved identification of a gesture based on data obtained from multiple devices. FIG. 1 shows an example process according to an implementation of the disclosed subject matter. As shown, a method may include receiving an indication of an onset of a gesture, from a first device, at a gesture coordinating device, at 101. Next, first subsequent data describing the gesture may be received from a second device, at the gesture coordinating device, at 102. A device as used herein may be a tablet, a wearable computer, a smartphone, a laptop, a mobile device, a set-top box, a PC, a TV, an audio system, and another other device which may be used to detect a gesture. A device may include one or more sensors such as an ambient light sensor, an accelerometer, a gyroscope, a camera, a magnetometer, a speaker, a microphone, a touch screen, and the like. For example, the onset of the gesture may be detected by one or more sensors on the first device and a corresponding indication may be provided to the gesture coordinating device. Similarly, one or more sensors on a second device may be used to obtain additional data describing the gesture, the onset of which was detected by the first device. The second device may provide this subsequent data describing the gesture to the gesture coordinating device. In some cases, following receipt of an indication of the onset of a gesture from a first device, the first device and/or the gesture coordinating device may instruct the second device to activate a second sensor that may capture the first subsequent data. Based on the indication of the onset of the gesture, received from the first device, and the first subsequent data describing the gesture, received from the second device, the gesture may be identified, for example, by the gesture coordinating device, at 103.

Figure 2:
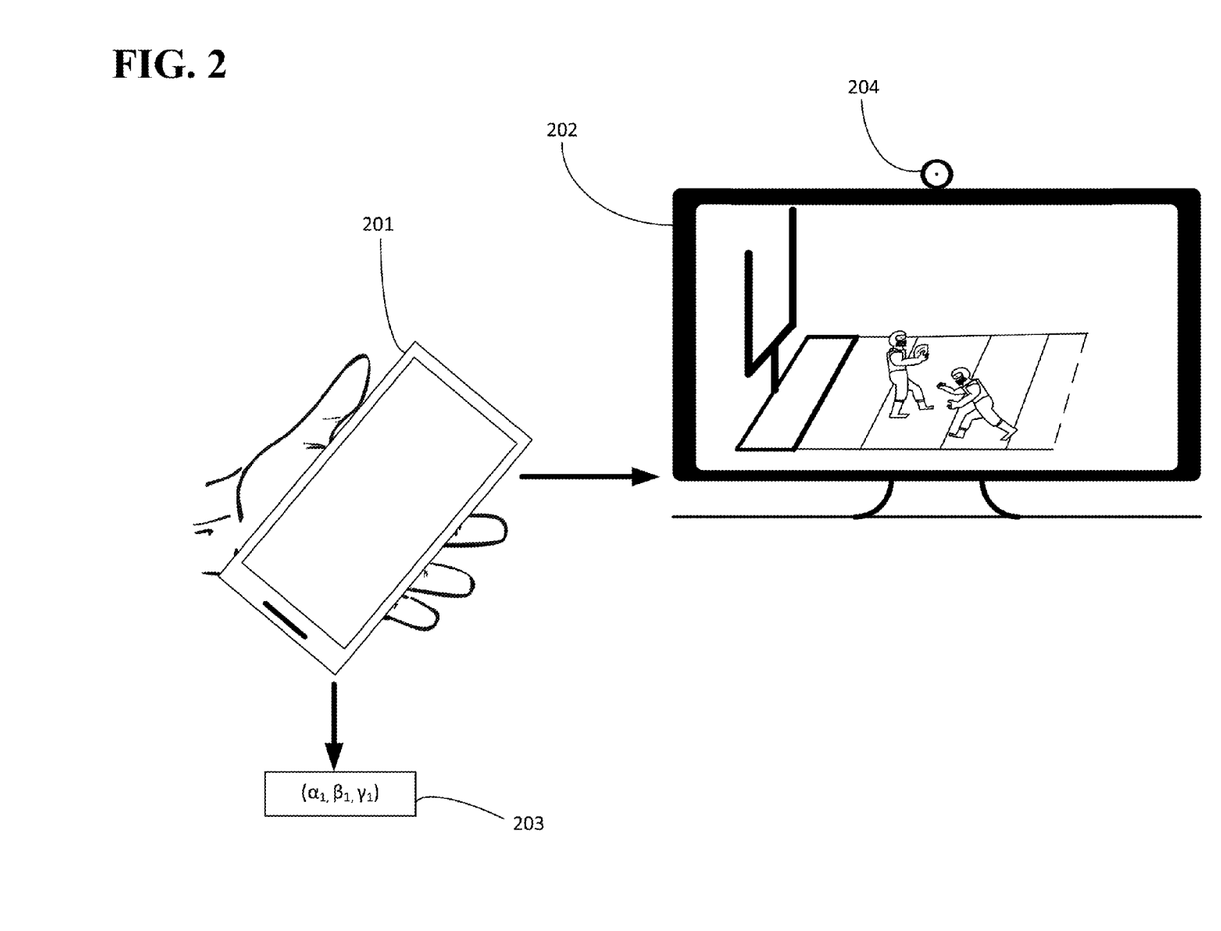
FIG. 2 shows an example system arrangement according to an implementation of the disclosed subject matter.

FIG. 2 shows an example system arrangement according to an implementation of the disclosed subject matter. As shown, a user may be using a device 201, such as a smartphone. The user may wish to transfer content, currently being displayed on smartphone 201, to a device 202, such as a TV, using a gesture performed on the device 201 towards the device 202. A gesture may be any interaction by a user with a device, such as moving, waving, shaking, pointing, tapping, touching, and the like, of a device. The user may perform a gesture motion by moving the smartphone 201 toward TV 202. Smartphone 201 may detect the onset of the gesture based data obtained by one or more sensors on the device. For example, motion data 203 may be obtained from an IMU of the smartphone 201. As a specific example, motion data 203 may include an angle associated with the yaw (e.g., $\alpha_1$) of the smartphone 201, an angle associated with the pitch (e.g., $\beta_1$) of the smartphone 201, an angle associated with the roll (e.g., $\gamma_1$) of the smartphone, and/or an acceleration of the smartphone. Although not shown in FIG. 2, the motion data may include a stream of readings from an IMU such as an accelerometer on the smartphone 201. In this case, detection of the onset of the gesture may not depend on the static state of the smartphone 201, but rather on a motion signature over time. The smartphone 201 may provide an indication of the onset of the gesture to a gesture coordinating device (not shown). The smartphone 201 and/or the gesture coordinating device may instruct the TV 202 to activate a sensor 204 on the TV 202 to obtain subsequent data describing the gesture. In some cases, the detection of the onset of the gesture from smartphone 201 may trigger the TV 202 to activate sensor 204, such as a camera. The camera 204 may be used obtain subsequent data describing the gesture, for example, the camera 204 may be used to determine that the smartphone 201 is pointed in a direction towards the TV 202. The gesture coordinating device may receive this subsequent data from the TV 202. Based on the motion data 203 and the received subsequent data from TV 202 using camera 204, the gesture coordinating device may identify the gesture. For example, gesture coordinating device may identify the gesture as intending for content to be transferred to the TV 202. In some cases, the gesture coordinating device may provide an indication of the identified gesture to the first device, the second device, and/or any other device associated with the identified gesture.

As a result of identifying the gesture, an action may be performed based on the gesture identified. An action may be performed by the first device, the second device, the gesture coordinating device, and/or any other device that may receive an indication of the identified gesture. As in the example above, based on the identified gesture, e.g., that the user intends to transfer content from the smartphone to the TV, the content may be transferred to the TV 202. For example, the content may be transferred to the TV 202 from either the smartphone 201, the gesture coordinating device, or from a remote server.

In some cases, identification of a gesture by a gesture coordinating device may be based on data and/or information in addition to a received indication of the onset of a gesture and subsequent data. As in the example above, a gesture by a user of a smartphone intending to transfer content to a TV may implicate security issues if the gesture is falsely identified. For example, if a gesture is falsely identified, content may be transferred to a device when the user may not have intended to cause such a transfer. Accordingly, additional data and/or information may be used to identify a gesture by a gesture coordinating device to avoid falsely triggering an action based on a falsely identified gesture. Referring back to FIG. 2, according to an implementation, a first token may be received, at the gesture coordinating device, from the first device in addition to the indication of the onset of a gesture. Similarly, a second token may be received, from the second device, in addition to the subsequent data describing the gesture. The gesture coordinating device may activate an authentication protocol to determine that the user intends the gesture between the two devices identified by the first and second tokens. For example, the gesture coordinating device may also use GPS location information from each device to confirm that the devices are co-located. In this case, identification of the gesture by the gesture coordinating device may be further based on an authentication of the devices and verification of the user's intent based on the gesture. For example, if the gesture coordinating device is unable to authenticate the devices or does not receive a token from one of the devices at all, the gesture coordinating device may not identify the gesture.

As mentioned above, the detection of the onset of a gesture on a first device may trigger additional functionality on both the first device and/or a second device. Referring back to FIG. 2, an accelerometer and/or gyroscope may obtain motion data 203 on the first device 201, which may trigger the camera 204 on the second device 202 to turn on and obtain first subsequent data, such as an image depicting the direction of the first device 201 relative to the second device 202. In addition, the gesture coordinating device may receive second subsequent data from the first device, which may be triggered by the onset of the gesture detected at the first device. As an example, the detection of the onset of a gesture on the first device 201 may also trigger a camera (not shown) on the first device 201 to turn on and obtain second subsequent data, such as another image depicting the direction of the first 201 relative to the second device 202. In some cases, the gesture coordinating device may instruct the first device to activate a third sensor that captures the second subsequent data. In this case, the motion data 203 from the first device 201, the first subsequent data received from the second device 202 and the second subsequent data received from the first device 201 may be used to identify a gesture.

According to an implementation, identifying the gesture based on the indication of the onset of the gesture and the first subsequent data may include determining that each of the indication and the first subsequent data exceeds a gesture detection threshold. For example, a gesture coordinating device may receive an indication of the onset of a gesture which may include data such as motion data 203. Motion data 203 may include an angle associated with the yaw (e.g., $\alpha_1$) of the smartphone 201, an angle associated with the pitch (e.g., $\beta_1$) of the smartphone 201, an angle associated with the roll (e.g., $\gamma_1$) of the smartphone, and/or an acceleration of the smartphone. The gesture coordinating device may evaluate the motion data 203 to determine if each or a combination of the data ($\alpha_1$, $\beta_1$, $\gamma_1$) and/or the acceleration of the first device 201 exceeds one or more thresholds associated with the data in order to identify the gesture. The gesture coordinating device may similarly evaluate the subsequent data received from the second device, the first device, and any other device from which subsequent data may be received. For example, if the acceleration of the first device 201 does not exceed an acceleration threshold X and/or the directional data received from the second device 202 does not exceed a directional threshold Y, the gesture coordinating device may not identify the gesture. In some cases, a threshold for identifying a gesture may be based on the time period during which the indication of the onset of a gesture and subsequent data from one or more devices is received by the gesture coordinating device. For example, the gesture coordinating device may evaluate the data received from multiple sensors on multiple devices with an integrated highly accurate master timing clock. By simultaneously evaluating the data received from multiple sensors combined with timing information, from a synchronized clock, associated with the data from each of the multiple sensors, a gesture may be identified using sensor fusion. This may result in more accurate gesture identification by the gesture coordinating device.

In some cases, a gesture detection threshold may be based on the number of sensors, the types of data, and/or devices from which subsequent data describing the gesture is received by the gesture coordinating device. For example, the gesture coordinating device may identify a gesture if data is received from a minimum of X sensors, located on one or more devices. Similarly, the gesture coordinating device may identify the gesture if data is received from a minimum of Y devices. As another example, the gesture coordinating device may identify a gesture if a predefined combination of types of data are received such as motion data, angle data, directional data, image data, Doppler shift data, and the like. Any other threshold, data, and/or information may be used to identify the gesture.

Figure 3:
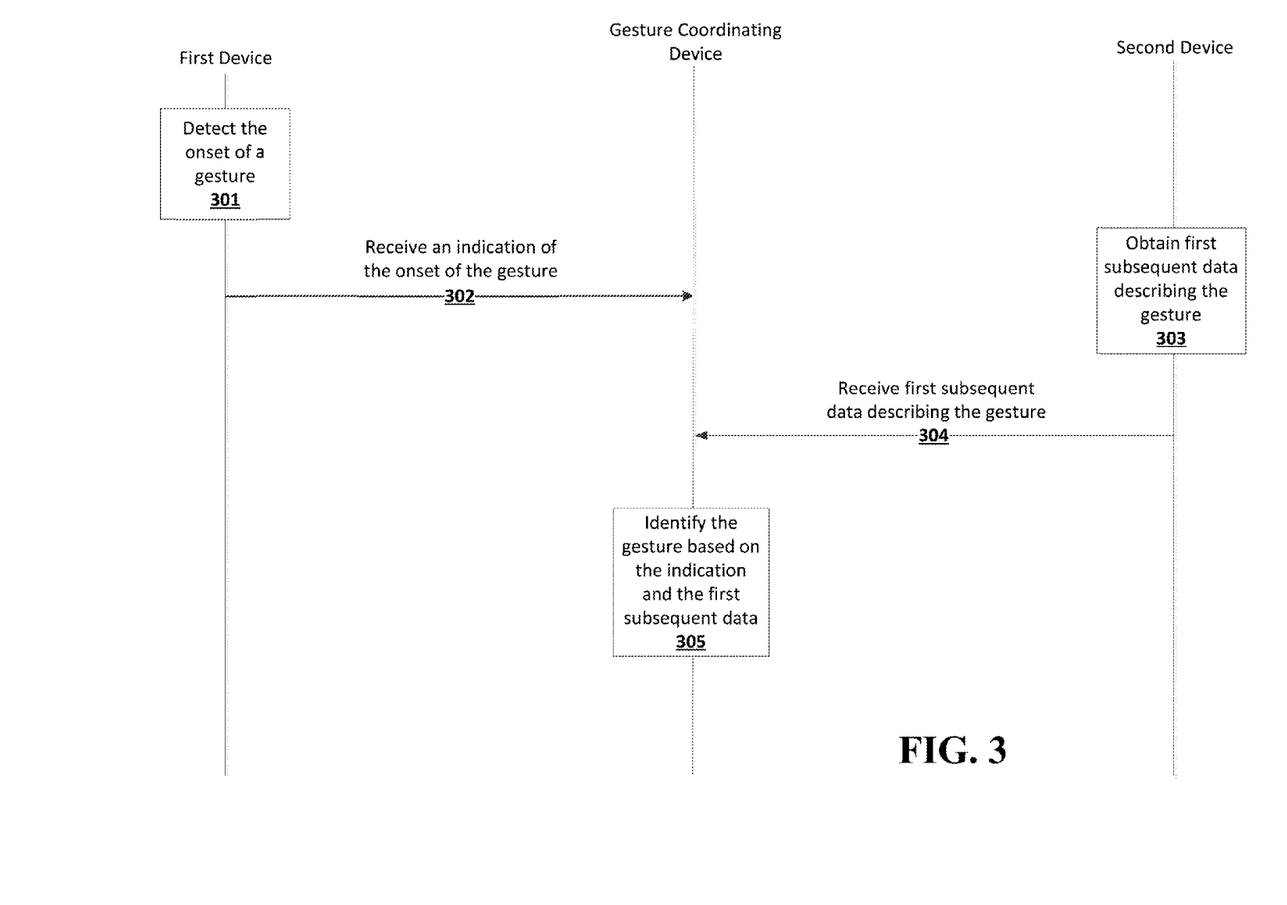
FIG. 3 shows an example information flow according to an implementation of the disclosed subject matter.

FIG. 3 shows an example information flow according to an implementation of the disclosed subject matter. As shown, a first device may detect the onset of a gesture, at 301. A gesture coordinating device may receive an indication of the onset of the gesture from the first device, at 302. In some cases, in response to the detection of the onset of the gesture by the first device, the second device may obtain subsequent data describing the gesture, at 303. Next, the gesture coordinating device may receive the subsequent data from the second device, at 304. Based on the indication of the onset of the gesture and the subsequent data, the gesture coordinating device may identify the gesture, at 305. Although not shown in FIG. 3, the first device and the second device may be in direct communication with one another. For example, the first device may indicate, to the second device, the detection of the onset of the gesture at the first device which may trigger a sensor to be activated on the second device to obtain subsequent data describing the gesture. Similarly, the second device may provide subsequent data describing the gesture to the first device. In this case, the first device may identify the gesture and provide an indication of the identified gesture to the gesture coordinating device. Alternatively, the first device may subsequently provide the subsequent data to the gesture coordinating device which may identify the gesture. As another example, the first device may provide an indication of the identified gesture to the gesture coordinating device, and the third coordinating device may perform an action and/or provide an instruction to another device based on the gesture identified. In some cases, multiple coordinating devices may be used, for example, in an implementation in which multiple devices are used to identify a gesture.

In some cases, the gesture coordinating device and/or the first device may trigger, using an audio signal, a sensor to be activated on the second device to obtain subsequent data describing the gesture. Because a sensor on the second device may need to be activated quickly as the gesture is occurring, one technique may be to use an audio signal to act as this trigger. In this case, all devices in an environment (e.g., a room) may be constantly listening for an audio signal such as by using a microphone, which has much lower power requirements than say a camera or a gyroscope, that may remain turned on. When the gesture coordinating device or the first device detects the onset of a gesture, the gesture coordinating device or the first device may immediately emit a pre-determined ultrasonic audio sequence at a volume level that is high enough for at least one of the devices in the environment to receive the audio sequence. As a result, immediately upon receiving the audio sequence, the one or more other devices, may automatically activate one or more additional sensors on the device to obtain subsequent data describing the gesture, thereby significantly reducing any lag or latency in identifying a gesture.

Figure 4:
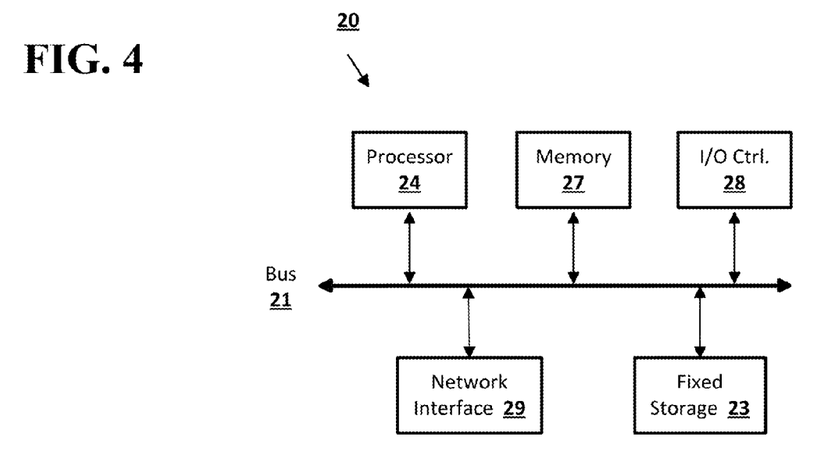
FIG. 4 shows a computer according to an embodiment of the disclosed subject matter.

Embodiments of the presently disclosed subject matter may be implemented in and used with a variety of component and network architectures. FIG. 4 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 5.

Many other devices or components (not shown) may be connected in a similar manner, such as document scanners, digital cameras, auxiliary, supplemental, or backup systems, or the like. Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 5:
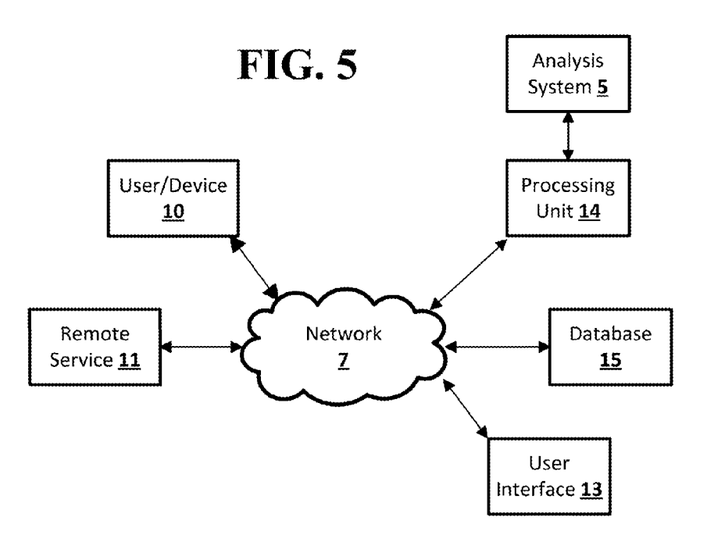
FIG. 5 shows a network configuration according to an embodiment of the disclosed subject matter.

FIG. 5 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   receiving, by a gesture coordinating detector, data from a first computing device indicating that a user of the first computing device has likely begun performing a gesture using the first computing device;
   transmitting, by the gesture coordinating detector, an instruction to a second computing device to indicate whether the user of the first computing device is likely performing the gesture, the indication as to whether the user of the first computing device is likely performing the gesture being based on an analysis of sensor data collected by the second computing device;
   in response to the instruction, receiving, by the gesture coordinating detector, data from the second computing device indicating whether the user of the first computing device is likely performing, or has likely begun performing, the gesture; and
   determining, by the gesture coordinating detector, whether the user of the first computing device is likely performing, or has likely begun performing, the gesture based at least on (i) the data from the first computing device indicating that the user of the first computing device has likely begun performing the gesture, and (ii) the data from the second computing device indicating that the user of the first computing device is likely performing, or has likely begun performing, the gesture.

2. The computer-implemented method of claim 1, wherein the data from the first computing device comprises at least one of an angle associated with a yaw of the first computing device, an angle associated with a roll of the first computing device, or an acceleration of the first computing device, and
   wherein the gesture coordinating detector is implemented in the first computing device or a cloud-based device.

3. The computer-implemented method of claim 1, wherein the instruction transmitted to the second computing device comprises an instruction to activate at least one sensor on the second computing device to obtain the data from the second computing device indicating whether the user of the first computing device is likely performing, or has likely begun performing, the gesture.

4. The computer-implemented method of claim 1, further comprising:
   determining that the user of the first computing device is likely to be performing, or has likely begun performing, the gesture; and
   executing a function associated with the gesture.

5. The computer-implemented method of claim 4, further comprising:
   providing, to the first device, an indication that the first computing device is likely to be performing, or has likely begun performing, the gesture in response to determining that the user of the first computing device is likely to be performing, or has likely begun performing, the gesture.

6. The computer-implemented method of claim 1, further comprising:
   identifying the gesture based on additional data including at least one of: i) authentication data of the first computing device and the second computing device, or ii) location information of the first computing device and the second computing device.

7. The computer-implemented method of claim 4, wherein determining that the user of the first computing device is likely to be performing, or has likely begun performing, the gesture further comprises determining that subsequent data received from the first computing device exceeds a gesture detection threshold, the gesture detection threshold being determined by at least one of a number of sensors from which the gesture coordinating detector receives the subsequent data, a number of devices from which the gesture coordinating detector receives the subsequent data, and types of data in the subsequent data received by the gesture coordinating detector.

8. A non-transitory computer-readable storage medium encoded with a computer program, the program comprising instructions that upon execution by a computer cause the computer to perform operations comprising:
   receiving data from a first computing device indicating that a user of the first computing device has likely begun performing a gesture using the first computing device;
   transmitting an instruction to a second computing device to indicate whether the user of the first computing device is likely performing the gesture, the indication as to whether the user of the first computing device is likely performing the gesture being based on an analysis of sensor data collected by the second computing device;
   in response to the instruction, receiving data from the second computing device indicating whether the user of the first computing device is likely performing, or has likely begun performing, the gesture; and determining whether the user of the first computing device is likely performing, or has likely begun performing, the gesture based at least on (i) the data from the first computing device indicating that the user of the first computing device has likely begun performing the gesture, and (ii) the data from the second computing device indicating that the user of the first computing device is likely performing, or has likely begun performing, the gesture.

9. The non-transitory computer-readable storage medium of claim 8, wherein the data from the first computing device comprises at least one of an angle associated with a yaw of the first computing device, an angle associated with a roll of the first computing device, or an acceleration of the first computing device.

10. The non-transitory computer-readable storage medium of claim 8, wherein the instruction transmitted to the second computing device comprises an instruction to activate at least one sensor on the second computing device to obtain the data from the second computing device indicating whether the user of the first computing device is likely performing, or has likely begun performing, the gesture.

11. The non-transitory computer-readable storage medium of claim 8, further comprising:

determining that the user of the first computing device is likely to be performing, or has likely begun performing, the gesture; and executing a function associated with the gesture.

12. The non-transitory computer-readable storage medium of claim 11, further comprising:

providing, to the first device, an indication that the first computing device is likely to be performing, or has likely begun performing, the gesture in response to determining that the user of the first computing device is likely to be performing, or has likely begun performing, the gesture.

13. The non-transitory computer-readable storage medium of claim 8, further comprising:

identifying the gesture based on additional data including at least one of: i) authentication data of the first computing device and the second computing device, or ii) location information of the first computing device and the second computing device.

14. The non-transitory computer-readable storage medium of claim 11, wherein determining that the user of the first computing device is likely to be performing, or has likely begun performing, the gesture further comprises determining that subsequent data received from the first computing device exceeds a gesture detection threshold, the gesture detection threshold being determined by at least one of a number of sensors from which a gesture coordinating detector receives the subsequent data, a number of devices from which the gesture coordinating detector receives the subsequent data, and types of data in the subsequent data received by the gesture coordinating detector.

15. A system comprising:

one or more processors and one or more computer storage media storing instructions that are operable, when executed by the one or more processors, to cause the one or more processors to perform operations comprising:

receiving data from a first computing device indicating that a user of the first computing device has likely begun performing a gesture using the first computing device;

transmitting an instruction to a second computing device to indicate whether the user of the first computing device is likely performing the gesture, the indication as to whether the user of the first computing device is likely performing the gesture being based on an analysis of sensor data collected by the second computing device;

in response to the instruction, receiving data from the second computing device indicating whether the user of the first computing device is likely performing, or has likely begun performing, the gesture; and determining; whether the user of the first computing device is likely performing, or has likely begun performing, the gesture based at least on (i) the data from the first computing device indicating that the user of the first computing device has likely begun performing the gesture, and (ii) the data from the second computing device indicating that the user of the first computing device is likely performing, or has likely begun performing, the gesture.

16. The system of claim 15, wherein the data from the first computing device comprises at least one of an angle associated with a yaw of the first computing device, an angle associated with a roll of the first computing device, or an acceleration of the first computing device.

17. The system of claim 15, wherein the instruction transmitted to the second computing device comprises an instruction to activate at least one sensor on the second computing device to obtain the data from the second computing device indicating whether the user of the first computing device is likely performing, or has likely begun performing, the gesture.

18. The system of claim 15, further comprising:

determining that the user of the first computing device is likely to be performing, or has likely begun performing, the gesture; and executing a function associated with the gesture.

19. The system of claim 18, further comprising:

providing, to the first device, an indication that the first computing device is likely to be performing, or has likely begun performing, the gesture in response to determining that the user of the first computing device is likely to be performing, or has likely begun performing, the gesture.

20. The system of claim 15, further comprising:

identifying the gesture based on additional data including at least one of: i) authentication data of the first computing device and the second computing device, or ii) location information of the first computing device and the second computing device.

* * * * *